US010948863B2

(12) United States Patent
Tomishima

(10) Patent No.: US 10,948,863 B2
(45) Date of Patent: Mar. 16, 2021

(54) IMAGE FORMING APPARATUS AND METHOD FOR IMAGE FORMING

(71) Applicant: HEWLETT-PACKARD DEVELOPMENT COMPANY, L.P., Spring, TX (US)

(72) Inventor: Yuichiro Tomishima, Yokohama (JP)

(73) Assignee: HEWLETT-PACKARD DEVELOPMENT COMPANY, L.P., Spring, TX (US)

(*) Notice: Subject to any disclaimer, the term of this patent is extended or adjusted under 35 U.S.C. 154(b) by 0 days.

(21) Appl. No.: 16/857,973

(22) Filed: Apr. 24, 2020

(65) Prior Publication Data
US 2020/0249609 A1 Aug. 6, 2020

Related U.S. Application Data

(63) Continuation of application No. 16/396,170, filed on Apr. 26, 2019, now Pat. No. 10,671,007, which is a continuation of application No. PCT/KR2017/006291, filed on Jun. 16, 2017.

(30) Foreign Application Priority Data

Oct. 28, 2016 (JP) .............................. JP2016-211369

(51) Int. Cl.
G03G 15/00 (2006.01)
B41J 11/00 (2006.01)
(52) U.S. Cl.
CPC ........ *G03G 15/5029* (2013.01); *B41J 11/009* (2013.01); *G03G 15/00* (2013.01)

(58) Field of Classification Search
CPC ............... G03G 15/5029; G03G 15/00; G03G 2215/00616; G03G 2215/00738; G03G 21/00; B41J 11/009; B41J 11/0095; G01B 11/0691
See application file for complete search history.

(56) References Cited

U.S. PATENT DOCUMENTS

2005/0078973 A1* 4/2005 Suzuki .................... B65H 7/14
399/45
2005/0276198 A1 12/2005 Kokubo
2008/0130006 A1 6/2008 Lee et al.
2008/0240750 A1* 10/2008 Hanamoto ......... G03G 21/1623
399/45
2009/0251504 A1 10/2009 White
(Continued)

FOREIGN PATENT DOCUMENTS

JP H08018726 1/1996
JP 11-20988 1/1999
(Continued)

Primary Examiner — G. M. A Hyder
(74) Attorney, Agent, or Firm — Staas & Halsey LLP

(57) ABSTRACT

An image forming apparatus including an image forming device, a sensor, and a processor. The image forming device is to form an image on recording medium. The sensor is to irradiate light to the recording medium and detect an amount of light transmitted through the recording medium and an amount of light reflected from the recording medium, resulting in a control of a printing operation of the image forming device based the amount of light transmitted through the printing medium and the amount of light reflected from the printing medium.

13 Claims, 16 Drawing Sheets

(56) References Cited

U.S. PATENT DOCUMENTS

| | | | |
|---|---|---|---|
| 2015/0062582 A1* | 3/2015 | Adachi | G01B 11/06 |
| | | | 356/369 |
| 2015/0186761 A1 | 7/2015 | Fujii | |
| 2017/0214812 A1 | 7/2017 | Tomishima | |
| 2020/0264103 A1* | 8/2020 | Tomishima | G01N 21/57 |

FOREIGN PATENT DOCUMENTS

| | | |
|---|---|---|
| JP | 2005-070508 | 3/2005 |
| JP | 2006-023288 | 1/2006 |
| JP | 2007003735 | 1/2007 |
| JP | 2012-88227 | 5/2012 |
| JP | 2013195177 | 9/2013 |
| JP | 2014025864 | 2/2014 |
| JP | 2015-25756 | 2/2015 |
| JP | 2015-108659 | 6/2015 |
| JP | 2015200825 | 11/2015 |
| KR | 10-2009-0001187 | 1/2009 |

\* cited by examiner

FIG. 6

CALIBRATION TABLE A

| Km | DISTANCE BETWEEN SENSOR UNITS OF EACH MODEL (mm) |
|---|---|
| 1 | 1～10 |
| 2 | 11～20 |
| 3 | 21～ |

FIG. 7

CALIBRATION TABLE B

| KA VALUE | AMOUNT OF CALIBRATED EMITTED LIGHT(%) |
|---|---|
| 1 | Reserve(WHEN REFERENCE PAPER IS CHANGED) |
| 2 | Reserve(WHEN REFERENCE PAPER IS CHANGED) |
| 3 | INITIAL VALUE(WHEN PRODUCTION PROCESS IS SET) |
| 4 | CORRESPONDS TO +5% |
| 5 | CORRESPONDS TO +10% |
| 6 | CORRESPONDS TO +20% |

FIG. 11

| | AMOUNT OF TRANSMITTED LIGHT(V) | AMOUNT OF DIFFUSED REFLECTED LIGHT(V) | AMOUNT OF REGULAR REFLECTED LIGHT(V) | $K_m$ | $K_a$ | $K_{thickness}$ |
|---|---|---|---|---|---|---|
| A | 1.50 | 1.08 | 1.08 | 1 | 3 | 1.39 |
| B | 1.38 | 1.12 | 1.13 | 1 | 3 | 1.26 |
| C | 1.32 | 1.08 | 1.14 | 1 | 3 | 1.39 |
| D | 1.18 | 1.14 | 1.22 | 1 | 3 | 1.25 |

IMAGE FORMING APPARATUS AND METHOD FOR IMAGE FORMING

This application is a continuation of U.S. patent application Ser. No. 16/396,170, filed Apr. 26, 2019, which is a continuation application of International Patent Application No. PCT/KR2017/006291, filed Jun. 16, 2017, which claims the benefit of Japanese Patent Application No. 2016-211369, filed Oct. 28, 2016, in the Japanese Intellectual Property Office, and the disclosures of which are incorporated by reference herein in their entirety.

BACKGROUND

An image forming apparatus refers to an apparatus that prints print data generated by a printing control terminal device such as a computer on a recording paper. Examples of such an image forming apparatus include a copier, a printer, a facsimile, or a multifunction peripheral (MFP) that combines functions of the copier, the printer, and the facsimile through a single device.

Generally, such an image forming apparatus performs a printing operation using a plurality of types of recording medium. Thus, the image forming apparatus has printing conditions such as a conveyance speed, a transfer condition and a fixing condition suitable for various kinds of printing paper and performs printing by changing the printing conditions according to types of printing paper.

In the image forming apparatus, it is necessary to determine or set the types of printing paper in advance to perform printing under appropriate printing conditions. To determine such printing paper, a technique for determining the types of printing paper using data output from an optical sensor has commonly been used.

BRIEF DESCRIPTION OF THE DRAWINGS

FIG. 6 is a view illustrating an example of a table relating to conveyance path width calibration coefficients (Km);

FIG. 7 is a view illustrating an example of a table relating to initial calibration coefficients (Ka);

FIG. 11 is a table illustrating results of detecting the amount of transmitted light, the amount of regular reflected light, and the amount of diffused reflected light regarding each of normal smoothness sheet materials (A and B) and high smoothness sheet materials (C and D);

DETAILED DESCRIPTION

Figure 1:
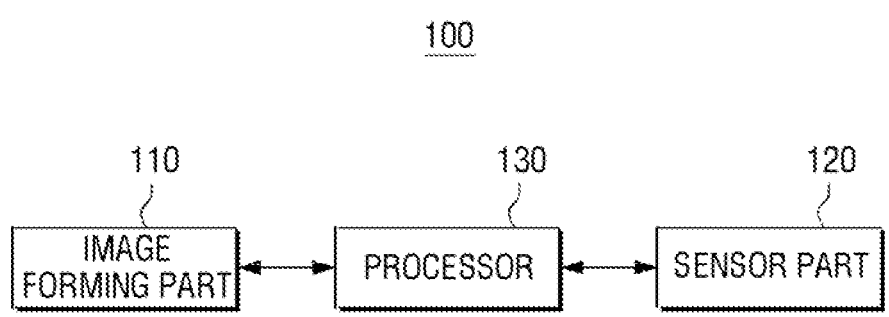
FIG. 1 is a block diagram illustrating a brief configuration of an image forming apparatus according to an example of the disclosure.

Hereinafter, various examples will be described in detail with reference to the accompanying drawings. The examples described below may be modified to be implemented in various different forms. In order to more clearly describe the features of the examples, a detailed description of matters known to those skilled in the art will be omitted.

In the disclosure, when it is described that an element is "coupled" to another element, the element may be "directly coupled" to the other element or "coupled" to the other element through a different element. In addition, unless explicitly described to the contrary, the word "comprise" and variations such as "comprises" or "comprising", will be understood to imply the inclusion of stated elements but not the exclusion of any other elements.

In the disclosure, an "image forming job" may denote any one of various jobs (e.g., printing, copying, scanning, and faxing) related to an image, such as forming an image or generating/storing/transmitting an image file, and a "job" may denote an image forming job, but may also denote a series of processes to perform the image forming job.

Also, an "image forming apparatus" refers to an apparatus printing print data generated in a terminal device such as a computer on a recording paper. Examples of the image forming apparatus includes a copier, a printer, a facsimile, or a multi-function printer (MPF) complexly realizing these functions through a single apparatus. The "image forming apparatus may refer to any apparatus capable of performing an image forming job, such as a printer, a scanner, a fax machine, a multi-function printer (MFP), and a display apparatus.

Also, "hard copy" may refer to an operation of outputting an image to a printing medium such as paper, and "soft copy" may refer to an operation of outputting an image on a display apparatus such as a TV, a monitor, or the like.

Also, "content" may refer to any type of data that is a target of an image forming job, such as a picture, an image, a document file, and the like.

Also, "print data" may refer to data converted into a format printable by a printer. Meanwhile, if a printer supports direct printing, a file itself may be print data.

Also, a "user" may refer to a person who performs an operation related to an image forming job using an image forming apparatus or using a device connected to the image forming apparatus wirelessly or wiredly. Also, "manager" may refer to a person having authority to access every function and system of an "image forming apparatus". "Manager" and "user" may be the same person.

Unless the types of printing paper are correctly determined or set, original image quality performance may not be ensured, and in the worst-case scenario, the apparatus may be broken down.

Examples of the case that the types of printing paper are incorrectly determined may vary, and an example thereof is an influence of smoothness, glossiness, a compression degree, etc. In an optical sensor mode, a weight or thickness of printing paper in the optical sensor system is detected on the basis of strength and weakness of light transmitting through the printing paper, i.e., on the basis of information regarding the amount of transmitted light obtained from a light receiving sensor, by irradiating light (generally, infrared light) to the printing paper.

That is, the weight or thickness is detected on the basis of a change in the amount of the transmitted light depending on whether the printing paper is heavy/light or thick/thin. However, in case of printing paper having high surface smoothness or glossiness and printing paper having high compression, the amount of reflected light increases and the amount of the transmitted light decreases. This may refer to that the amount of the transmitted light fluctuates due to factors other than weight, which deteriorates detection.

Figure 9:
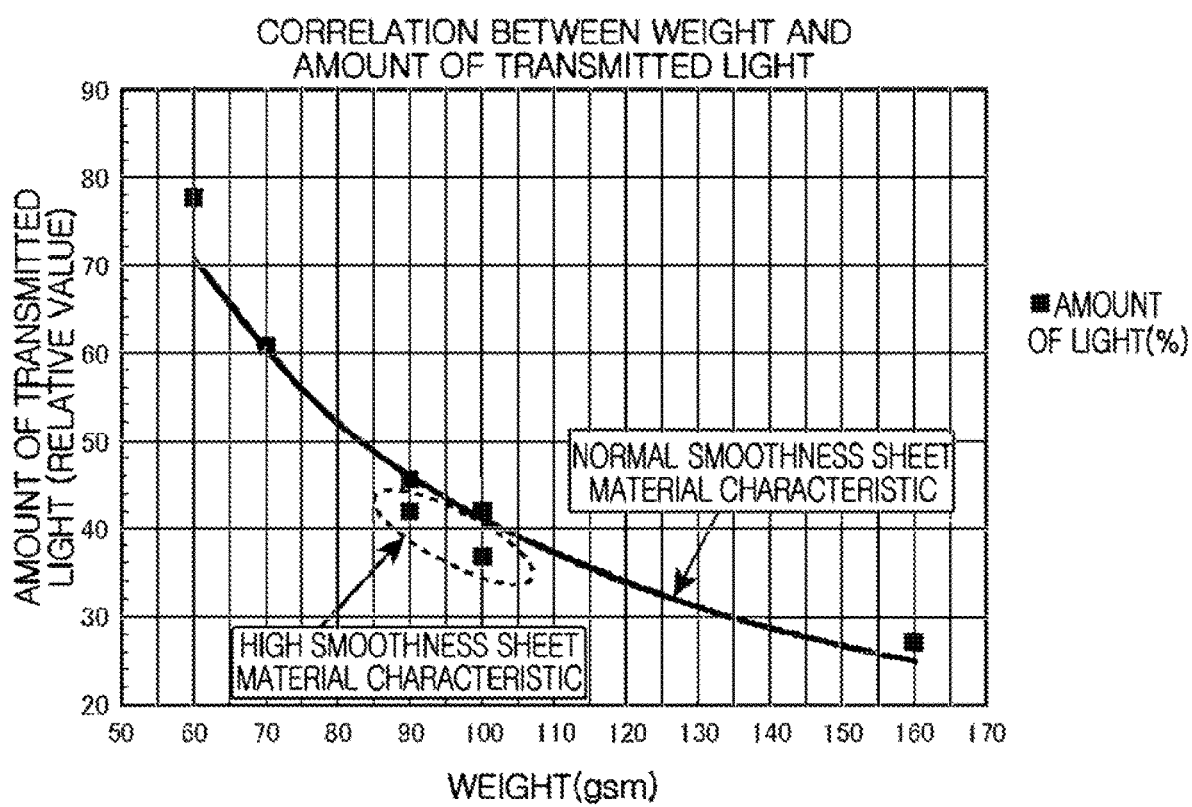
FIG. 9 is a graph illustrating a correlation between a weight and the amount of transmitted light of printing paper.
Figure 10:
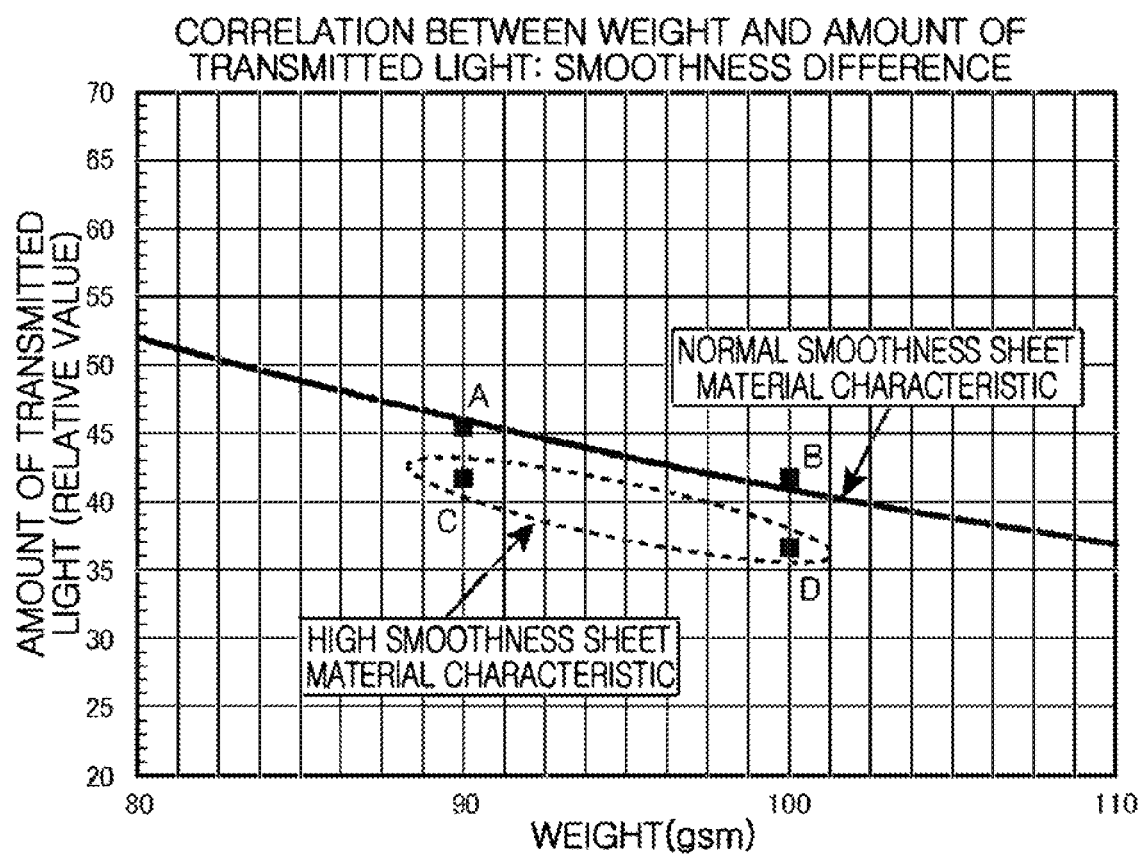
FIG. 10 is a graph illustrating a correlation between a weight and the amount of transmitted light of the printing paper.

In this connection, FIGS. 9 and 10 illustrate a correlation between the amount of the transmitted light and weight, in which the vertical axis represents the amount of the transmitted light as a relative value and the horizontal axis represents weight (gsm). Here, the amount of the transmitted light as a relative value indicates a relative amount of transmitted light of the printing paper with respect to an appropriately defined reference value.

As illustrated in FIGS. 9 and 10, a normal smoothness sheet material, which is so-called plain paper, has a certain correlation between the amount of the transmitted light and weight, and therefore, a weight may be determined on the basis of the correlation. Meanwhile, as shown in FIG. 10, in the case of high smoothness sheet materials (C and D) such as glossy paper, or the like, the amount of the transmitted light decreases, deviating from the correlation between the amount of the transmitted light and weight as the characteristic of the normal smoothness sheet material. Therefore, if the weight is determined on the basis of the above-described correlation, the weight may be erroneously determined.

Referring to the example of FIG. 10, the actual weight of the high-smoothness sheet material C is 90 (gsm), but if the weight is determined on the basis of the amount of the transmitted light, using the characteristic of the normal smoothness sheet material, i.e., the correlation between the amount of the transmitted light and weight in the normal smoothness sheet material, the weight of the high smoothness sheet material is erroneously determined as 100 (gsm).

Determining smoothness or glossiness of printing paper using an image pickup device and determining the weight using a correlation between the amount of the transmitted light and weight appropriate for the corresponding determined glossiness may need a high-priced device such as a CMOS and may involve complicated processing, resulting in an increase in cost.

FIG. 1 is a block diagram illustrating a brief configuration of an image forming apparatus according to an example of the disclosure.

Referring to FIG. 1, an image forming apparatus 100 includes an image forming part 110, a sensor part 120, and a processor 130.

The image forming part 110 prints print data. As an example, the image forming part 110 prints print data received through a communication interface 140 (to be described later).

Here, the image forming part 110 may perform the printing operation on the basis of a printing speed, a transfer condition, and a fixing condition corresponding to a thickness of the recording medium determined by the processor 130 (to be described later). As an example, the recording medium may be printing paper. A configuration of the image forming part 110 will be described later with reference to FIG. 3.

The sensor part 120 irradiates light to the printing paper and detects the amount of transmitted light transmitted through the printing paper and the amount of reflected light reflected from the printing paper at each of a plurality of positions. As an example, the sensor part 120 includes a light emitting part including at least one light emitting element irradiating light to the printing paper and at least one light receiving sensor detecting the amount of the transmitted light transmitted through the printing paper among light emitted from the light emitting element, and the amount of the reflected light reflected from the printing paper. A configuration and operation of the sensor part 120 will be described later with reference to FIG. 5.

The processor 130 controls each component in the image forming apparatus 100. Specifically, the processor 130 may be realized as a central processing unit (CPU), an application specific integrated circuit (ASIC), or the like. As an example, the processor 130 determines whether new paper is loaded if a loading box is opened or closed. If it is determined that new paper is loaded, the processor 130 may perform sequential operations to determine a thickness of the input paper.

As an example, the processor 130 may control the sensor part 120 to irradiate light to the printing paper and detect the amount of the transmitted light and the amount of light reflected from a plurality of positions, among the irradiated light.

The processor 130 may determine a thickness of the printing paper on the basis of the amount of the transmitted light and the amounts of a plurality of reflected lights and control the image forming part 110 to perform a printing operation on the basis of the determined thickness. A operation of determining the thickness of the printing paper will be described later in detail with reference to FIG. 4.

When the print data is received, the processor 130 may perform processing such as parsing on the received print data to generate binary data and control the image forming part 110 to print the generated binary data.

As described above, the image forming apparatus 100 according to the example determines the thickness of the printing paper in consideration of the amount of calibrated reflected light, as well as the amount of the transmitted light, and thus, an influence of a detection inhibiting factor such as smoothness, glossiness, and the like, of the printing paper may be suppressed and the thickness may be correctly detected.

In the above description, the printing operation is performed by determining the thickness of the paper, but it is also possible to perform the printing operation by determining a weight (gsm) of the paper in the above-described manner.

Although a simple configuration of the image forming apparatus has been described but various components may be additionally provided when the image forming apparatus is realized. This will be described below with reference to FIG. 2.

Figure 2:
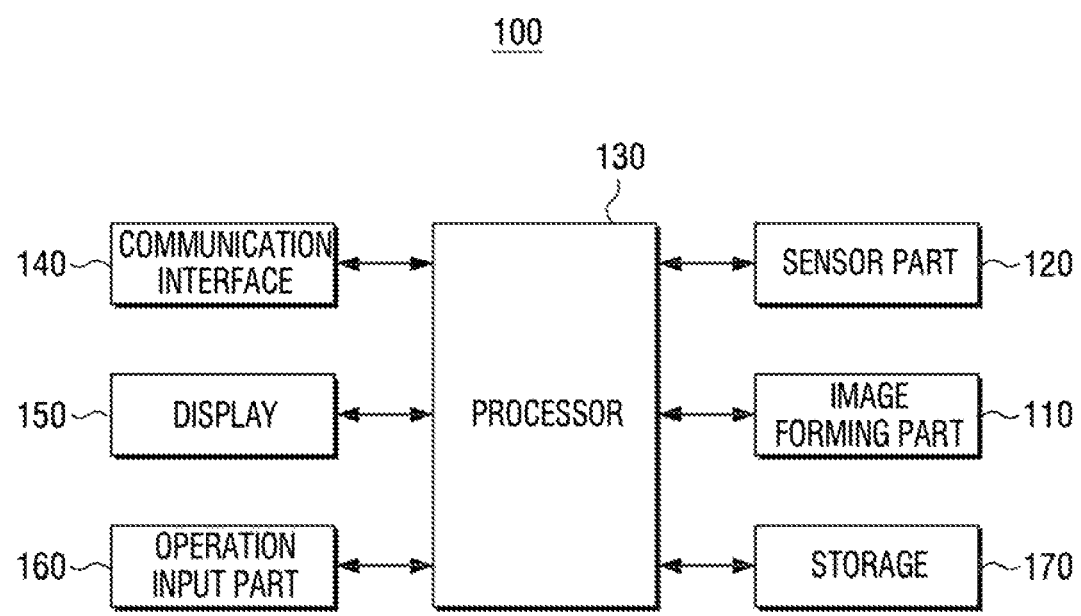
FIG. 2 is a block diagram illustrating a configuration of an image forming apparatus according to an example of the disclosure.

FIG. 2 is a block diagram illustrating a configuration of an image forming apparatus according to an example of the disclosure.

Referring to FIG. 2, the image forming apparatus 100 according to an example of the disclosure includes the image forming part 110, the sensor part 120, the processor 130, a communication interface 140, a display 150, an operation input part 160, and a storage 170. Here, the image forming apparatus 100 may be a multi-function peripheral (MPF), or the like, which complexly realizes a copier, a printer, and a facsimile, or functions thereof through the single apparatus.

The image forming part 110, the sensor part 120, and the processor 130 perform the same functions as those of the components of FIG. 1, and thus, a redundant description thereof will be omitted.

The communication interface 140 is connected to a print control terminal device (not shown) and receives print data from the print control terminal device. As an example, the communication interface 140 is formed to connect the image forming apparatus 100 to an external device and may also be connected to a terminal device via a local area network (LAN) and the Internet or may be connected thereto via a universal serial bus (USB) port, or a wireless communication (e.g., Wi-Fi 802.11a/b/g/n, NFC, Bluetooth) port.

The display 150 displays various types of information provided by the image forming apparatus 100. As an example, the display 150 may display a user interface window for selecting various functions provided by the image forming apparatus 100. The display 150 may be a monitor such as an LCD, a CRT, or an OLED or may be realized as a touch screen capable of simultaneously performing a function of the operation input part 160 (to be described later).

The display 150 may display a control menu for performing a function of the image forming apparatus 100.

The display 150 may display a screen for the user to input a distance between a light receiving sensor and a light emitting device. A distance between at least one of the plurality of light receiving sensors and the light emitting element may be input through the operation input part 160. Meanwhile, such distance information may be input through a separate distance measurement sensor at the time of implementation or may be input as a predetermined value by a manufacturer in advance.

The operation input part 160 may receive an input for a function selected by the user and a control command for the corresponding function. Here, the function may include a print function, a copy function, a scan function, a fax transmission function, and the like. Such a function control command may be received through a control menu displayed on the display 150.

The operation input part 160 may be implemented by a plurality of buttons, a keyboard, a mouse, and the like, or may be implemented as a touch screen capable of simultaneously performing the function of the display 150 described above.

The storage 170 may store the print data received through the communication interface 140. The storage 170 may be realized as a storage medium in the image forming apparatus 100 and an external storage medium, i.e., a removable disk including a USB memory, a storage medium connected to a host, a Web server via a network, or the like.

The storage 170 stores various calibration tables. Here, the calibration table may be a calibration table in which initial calibration coefficients corresponding to emission characteristics of the light emitting element are matched in advance or a calibration table in which conveyance path width calibration coefficients according to distances between a light receiving sensor detecting any one of the amount of the transmitted light, the amount of regular reflected light, and the amount of diffused reflected light (or diffused reflection) and the light emitting element.

Figure 3:
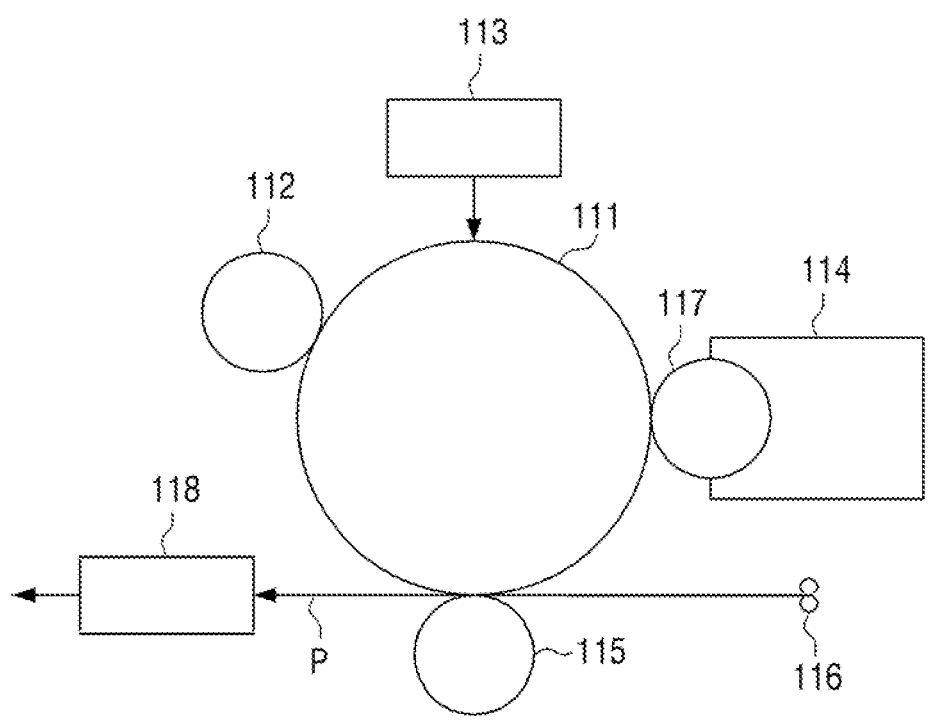
FIG. 3 is a view illustrating a configuration of an image forming part of FIG. 1 according to an example.

FIG. 3 is a view illustrating a configuration of an image forming part of FIG. 1 according to an example.

Referring to FIG. 3, the image forming part 110 may include a photosensitive drum 111, a charger 112, an exposure device 113, a developing device 114, a transfer roller 115, a paper transfer part 116, and a fixing device 118.

The image forming part 110 may further include a paper feeding part (not shown) for feeding the recording medium P. An electrostatic latent image is formed on the photosensitive drum 111. The photosensitive drum 111 may be referred to as a photosensitive drum, a photosensitive belt, or the like, depending on a form thereof.

Hereinafter, for description, a configuration of the image forming part 110 corresponding to one color will be described as an example but the image forming part 110 may include a plurality of photosensitive drums 111, a plurality of chargers 112, a plurality of exposure devices 113, and a plurality of developing devices 114 corresponding to a plurality of colors when realized.

The charger 112 charges a surface of the photosensitive drum 111 to a uniform potential. The charger 112 may be realized in the form of a corona charger, a charging roller, a charging brush, or the like.

The exposure device 113 changes a surface potential of the photosensitive drum 111 according to image information to be printed, thereby forming an electrostatic latent image on the surface of the photosensitive drum 111. In an example, the exposure device 113 may form an electrostatic latent image by irradiating light modulated according to the image information to be printed to the photosensitive drum 111. Such a type of exposure device 113 may be referred to as a scanner, or the like, and an LED may be used as a light source.

The developing device 114 may accommodate a developer therein and supplies the developer to the electrostatic latent image to develop the electrostatic latent image to a visible image. The developing device 114 may include a developing roller 117 that supplies the developer to the electrostatic latent image. For example, the developer may be supplied from the developing roller 117 to the electrostatic latent image formed on the photosensitive drum 111 by a developing electric field formed between the developing roller 117 and the photosensitive drum 111.

The visible image formed on the photosensitive drum 111 is transferred to a recording medium P by the transfer roller 115 or an intermediate transfer belt (not shown). The transfer roller 115 may transfer the visible image to the recording medium by, for example, an electrostatic transfer method. A visible image is attached to the recording medium P by electrostatic attraction.

The paper transfer part 116 may pick up the recording medium P from a paper tray and provide the recording medium P to the developing device 114. A configuration and operation of the paper transfer part 116 will be described later with reference to FIG. 4.

The fixing device 118 fixes a visible image on the recording medium P by applying heat and/or pressure to a visible image on the recording medium P. The printing operation is completed by the sequential processes.

The above-described developer is used each time the image forming operation is performed, and runs out when it is used for a predetermined time or longer. In this case, a unit for storing the developer (e.g., the above-described developing device 114 itself may be newly replaced). The parts or components which may be replaced during the use of the image forming apparatus are called consumable units or replaceable parts, and a memory (or CRUM chip) may be attached to such consumable units for appropriate management of the corresponding consumable units.

Figure 4:
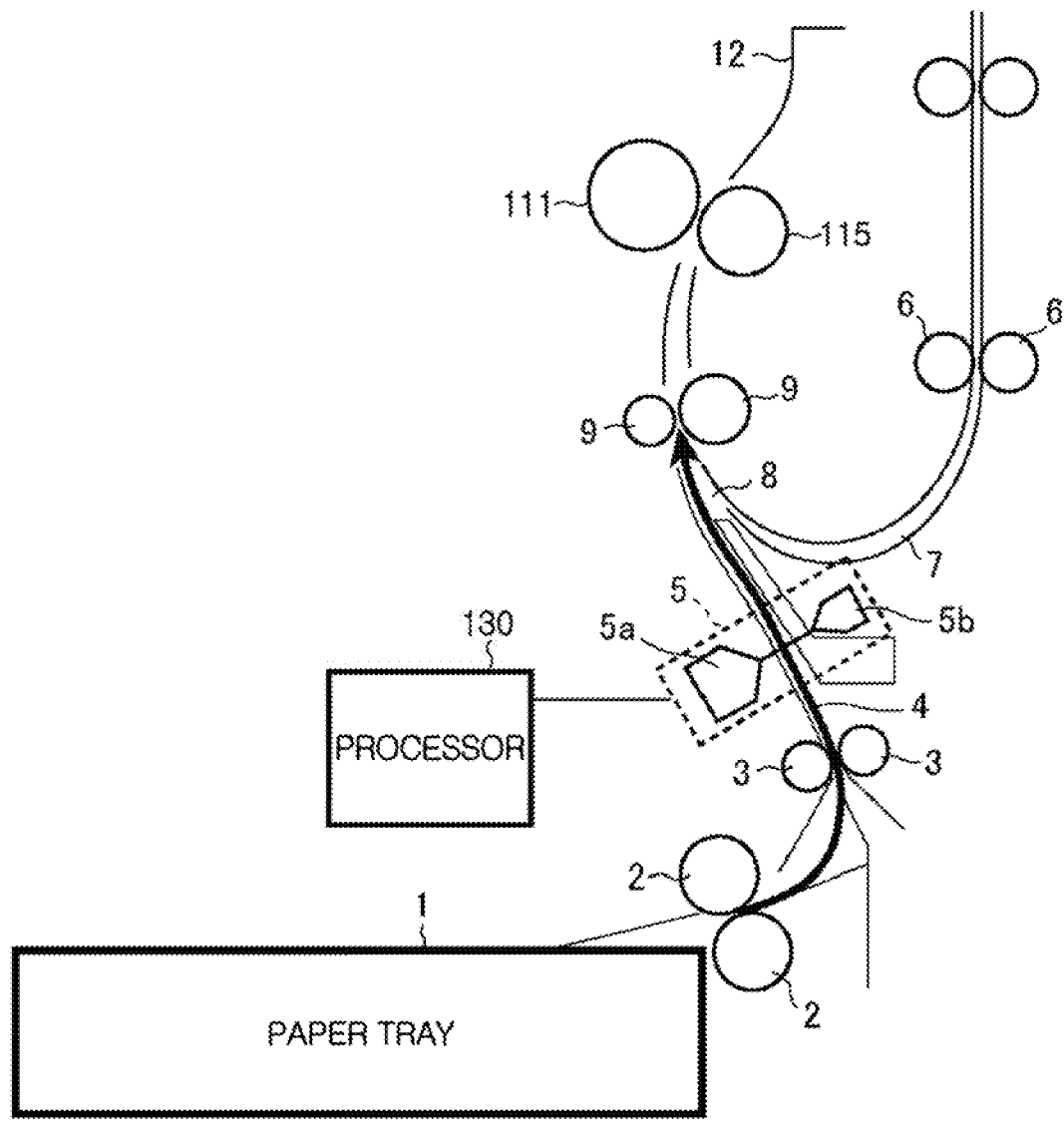
FIG. 4 is a schematic view illustrating a brief configuration for explaining an arrangement of a sensor part of FIG. 1.

FIG. 4 is a schematic view illustrating a brief configuration for explaining an arrangement of the sensor part of FIG. 1.

Referring to FIG. 4, the paper transfer part transfers the printing paper loaded in a paper tray 1 using a plurality of rollers 2, 3 and 9.

The paper tray 1 is a container housing printing paper (a medium for forming a toner image on a surface thereof).

A pickup roller 2 is a roller for picking up the printing paper stored in the paper tray 1.

A feed roller 3 is a roller that moves the printing paper picked up by the pickup roller 2 to a paper transfer path 4.

The sensor part 120 is provided in the vicinity of the paper transfer path 4 of the printing paper and detects the printing paper being transferred. The sensor part 120 may include optical sensors 5a and 5b which are called a media sensor 5.

A rear conveyance path roller 6 is a roller for conveying the printing paper on which one side printing has been completed in case of double side printing, along a rear conveyance path 7.

The paper transfer path 4 and the rear conveyance path 7 join at a junction 8 and the printing paper transferred by the feed roller 3 or the printing paper conveyed by the rear conveyance path roller 6 passes through the junction 8.

A register roller 9 is a roller that supplies the printing paper, which has passed through the junction 8, to the transfer roller 115.

The transfer roller 115 is provided at a position opposing the photosensitive drum 111. When the printing paper is supplied between the transfer roller 115 and the photosensitive drum 111 by the register roller 9, the transfer roller 115 rotates to allow the printing paper to come into close contact with the photosensitive drum 111 and allow a toner to be transferred to the printing paper as a bias having a polarity opposite to that of the photosensitive drum 111 is applied.

An image formation and conveyance part 12 discharges the printing paper to which the toner has been transferred by the transfer roller 10 to the outside, or, in case of double-sided printing, the image formation and conveyance part 12 provides the printing paper which has been one-side printed to the rear conveyance path 7.

The processor 130, which is a semiconductor device equipped with a CPU, performs various control processing, arithmetic processing, and the like, of the image forming apparatus.

The processor 130 acquires a voltage value output from each light receiving sensor configuring the sensor part 120 by executing various programs and serves to determine a type of the printing paper being conveyed on the basis of the acquired voltage value. Also, the processor 130 has a function of executing printing by selecting appropriate printing conditions such as a conveyance speed, a transfer condition, a fixing condition, and the like, of the printing paper according to the determined type of the paper.

One of items of the types of printing paper to be determined is a weight or thickness of the printing paper and the processor 130 determines this on the basis of an output value from each light receiving sensor configuring the sensor part 120. Therefore, the processor 130 may have a function as a thickness determining part.

Also, the voltage value of each sensor, which indicates the amount of received light detected by each light receiving sensor provided in the sensor part 120, is converted from an analog signal to a digital signal by an A/D converter (not shown) and provided as the digital signal to the processor 130.

Figure 5:
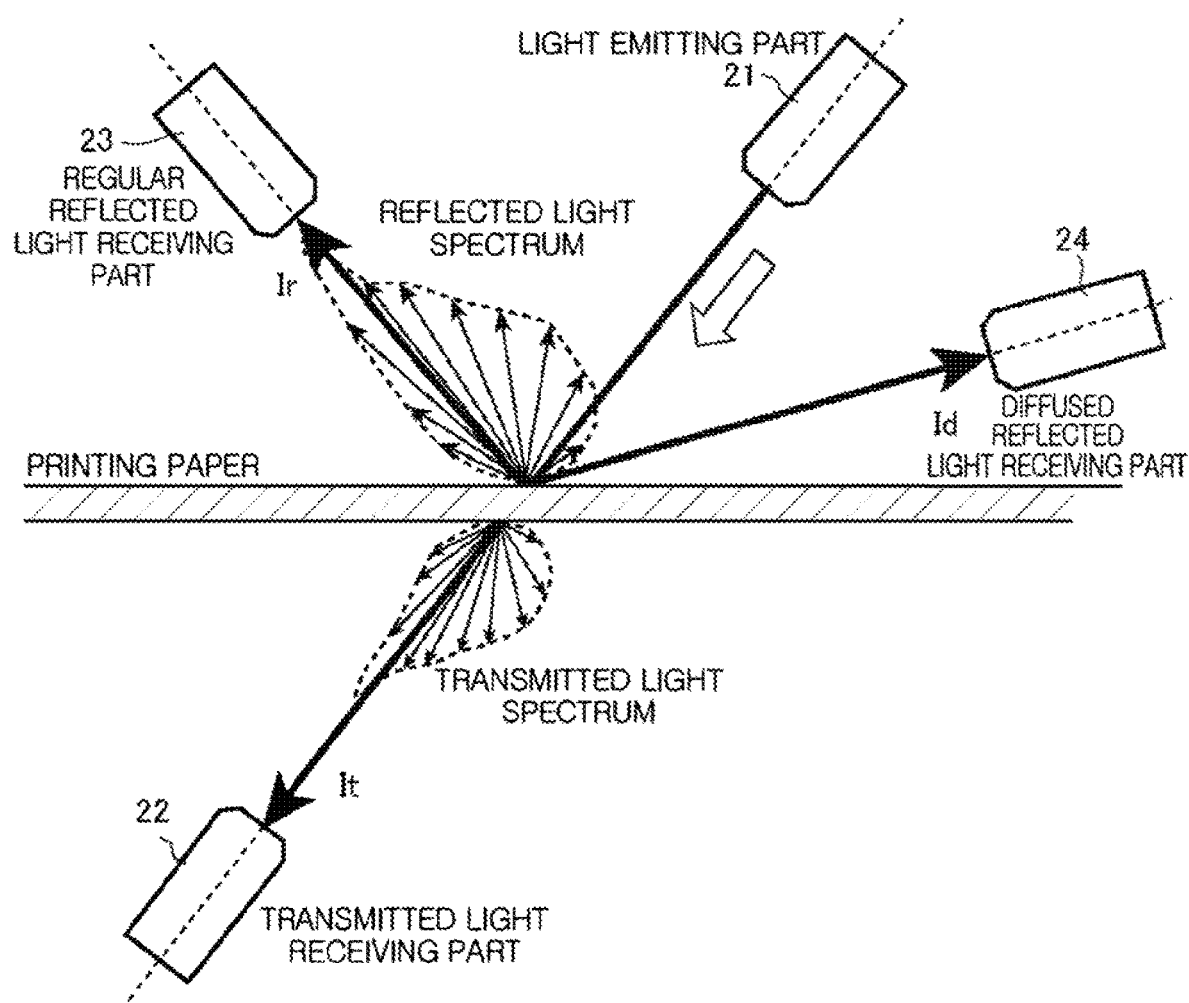
FIG. 5 is a conceptual view for explaining an operation of a paper sensor of the disclosure.

FIG. 5 is a conceptual view illustrating an operation of the sensor part 120 of the image forming apparatus of the example.

The sensor part 120 includes a light emitting part 21 and a plurality of light receiving parts 22, 23, and 24.

The light emitting part 21 is an optical component such as a light emitting element that emits light. The light emitting part 21 may be configured as a light emitting element itself or may be configured as a member including at least one light emitting element. As a high performance and low-priced light emitting element, for example, a light emitting diode (LED) may be used.

A transmitted light receiving part 22 is provided and substantially aligned with an optical path of light emitted from the light emitting part 21 and detects the amount of the transmitted light which is the amount of light transmitted through the printing paper being transferred along the paper transfer path 4, among light emitted from the light emitting part 21.

A regular reflected light receiving part 23 is installed at a position at which the amount of the regular reflected light, which is the amount of light regularly reflected by the printing paper being transferred along the paper transfer path 4, among the light emitted from the light emitting part 21, is detected.

A diffused reflected light receiving part 24 is provided at a position at which the amount of the diffused reflected light, which is the amount of light diffused and reflected by the printing paper, among the light emitted from the light emitting part 21, is detected.

For example, a photodiode (PD) or a phototransistor (PTr) may be used as a light receiving element configuring the transmitted light receiving part 22, the regular reflected light receiving part 23, and the diffused reflected light receiving part 24. Further, in the image forming apparatus of the example, as described above, each of the amount of the transmitted light, the amount of the regular reflected light, and the amount of the diffused reflected light are handled as a voltage value output by each light receiving sensor.

FIGS. 6 and 7 are views illustrating examples of calibration tables stored in the storage of FIG. 2. As an example, FIG. 6 is a view illustrating an example of a table relating to a conveyance path width calibration coefficient Km and FIG. 7 is a view illustrating an example of a table relating to an initial calibration coefficient Ka.

These calibration tables A and B are stored in a memory of the processor 130 or in a memory outside the processor 130. The calibration table A is a table in which the conveyance path width calibration coefficients Km corresponding to distances between the light emitting part 21 and any one of the light receiving parts (the transmitted light receiving part 22 in this example) are matched in advance, and the calibration table B is a calibration table in which the initial calibration coefficients Ka corresponding to emission characteristics of the light emitting part 21 are matched in advance.

The conveyance path width calibration coefficient Km is a calibration coefficient for calibrating a difference in configuration based on models of the image forming apparatus and is a calibration coefficient defined according to distances between the light emitting element and the light receiving sensor. As illustrated in FIG. 6, in the example, an integers of 1 to 3 are assigned according to distances between the two sensors 5a and 5b configuring the media sensor 5.

The calibration table (A) allows the functions related to the disclosure to be used universally in a plurality of models. When mounted on a model, the transport path width calibration coefficient Km is determined from the calibration table A on the basis of a distance between the sensors 5a and 5b of the corresponding model. The processing is executed at the time of manufacturing the apparatus, or the like, and thus, the value of the conveyance path width calibration coefficient Km is stored in the memory of the processor 130 or an external memory of the processor 130.

The initial calibration coefficient Ka is a calibration coefficient for calibrating a difference or variation of the emission characteristics of the light emitting part 21. As illustrated in FIG. 7, in this example, integers of 1 to 6 are assigned according to the amount of calibrated light. In this example, 1 and 2 are reserved and are not used here.

The amount of calibrated emitted light is a numerical value indicating a calibration percentage of the amount of light in calibration processing of increasing the amount of light performed to supplement the amount of light when the amount of emitted light from the light emitting part 21 is lowered due to deterioration with time or a temperature change, for example. For example, when the amount of light from the light emitting part 21 is lower than a predetermined value, calibration is performed to increase the amount of emitted light from the light emitting part 21 by 10%, and here, 10% is the amount of calibrated emitted light. The amount of emitted light is performed by increasing a pulse width modulation (PWM) value for driving an LED which emits light. The amount of emitted light is calibrated, for example, when the apparatus is turned on, immediately before printing is performed, or at every predetermined interval, and the like, and a resultant amount of calibrated emitted light is logged.

In the image forming apparatus of the example, as described below, robustness against variations in the amount of emitted light from the light emitting part 21 is high. Therefore, although the amount of light emitted from the light emitting part 21 is changed, the processing may be continued without calibrating the amount of emitted light itself in a considerable portion. However, if the amount of emitted light is significantly reduced to exceed a predetermined value, the amount of emitted light is calibrated.

The table of FIG. 7 is information set for changing the initial calibration coefficient Ka in accordance with the amount of calibrated emitted light when the amount of emitted light is significantly changed so it is calibrated. Also, in the example, 3 is set as an initial value of the initial calibration coefficient Ka.

Hereinafter, the outline of a process of determining a weight of printing paper according to the disclosure in the image forming apparatus of the example having the above configuration will be described with reference to FIG. 8. In the following description, a processing subject of each processing is omitted, but the following processing is executed by the processor 130.

Figure 8:
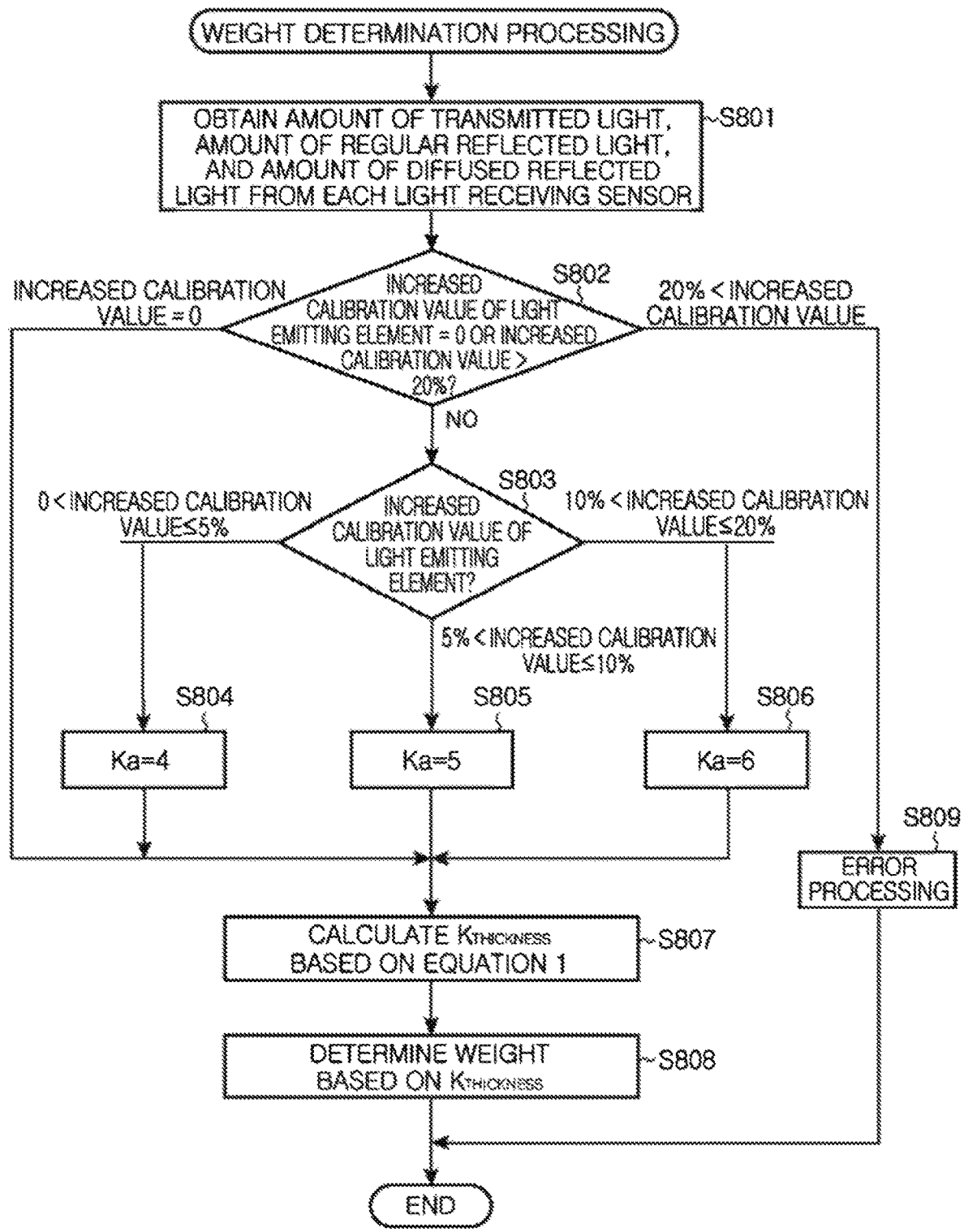
FIG. 8 is a flowchart illustrating an operation for forming an image in the disclosure.

FIG. 8 is a schematic view of a process of determining a weight of printing paper. This process is executed in a state in which printing paper is transferred along the paper transfer path 4 and the printing paper is caught in the sensor part 120, i.e., in a state in which light from the light emitting part 21 of the sensor part 120 is irradiated to the printing paper and reflected light or transmitted light from the printing paper is obtained.

First, in operation S801, light is irradiated from the light emitting part 21 to the printing paper, and the amount of light transmitted through the printing paper, the amount of regularly reflected light, and the amount of the diffused reflected light are obtained from the transmitted light receiving part 22, the regular reflected light receiving part 23, and the diffused reflected light receiving part 24, respectively. As described above, outputs from the respective light receiving parts are voltages and voltage values A/D-converted from the corresponding voltages are input to the processor 130.

In operation S802, it is determined whether an increase calibration value is 0 (i.e., the amount of emitted light is not increased) or whether the increase calibration value exceeds 20%.

As described above, the increase calibration value is logged (stored in the memory) in accordance with results of the calibration process of the amount of emitted light which is executed separately, and the determination in operation S802 is performed on the basis of the corresponding log (later operation S803 is the same).

If the increase calibration value is 0, the process proceeds to operation S807 (to be described later).

Meanwhile, if the increase calibration value exceeds 20%, error processing is performed in operation S809 and the process is terminated. As described hereinafter, in the image forming apparatus according to the example, robustness against a change in the amount of emitted light from the light emitting part 21 is high, and unless the amount of emitted light from the light emitting part 21 is changed by 60% or greater (a predetermined change proportion) with respect to an initial value, the amount of emitted light is not calibrated. When the amount of emitted light is changed by 60% or greater with respect to the initial value, that is, when the amount of emitted light is reduced to 40 or less with respect to the initial value as 100, the amount of emitted light is first increased. In an example of this example, on the basis of the initial value as 100, the increase calibration value is set to 5 to 0% when the amount of emitted light is 35 to 40, set to 10 to 5% when the amount of emitted light is 30 to 35, and set to 20 to 10% when the amount of emitted light is 20 to 30.

That is, the increase calibration value exceeding 20% indicates that the amount of emitted light from the light emitting part 21 is changed by 80% (predetermined upper limit value) or greater with respect to the initial value, and in this case. It is determined that the life the light emitting element of the light emitting part 21 has ended or the light emitting element has a fault, and error processing (operation S809) is performed. The error processing is processing such as stopping the print processing, displaying a warning, log of error contents, and the like.

If the increase calibration value is not 0 and does not exceed 20%, operation S803 is performed (operation S802: NO→operation S803). The processing of operations S803 to S806 is processing for changing the initial calibration coefficient Ka on the basis of the setting of the calibration table B (FIG. 7) according to the increase calibration value.

If the increase calibration value is greater than 0 and equal to or smaller than 5%, the initial calibration coefficient Ka is set to 4 (operation S803→operation S804).

If the increase calibration value is greater than 5% and equal to or smaller than 10%, the initial calibration coefficient Ka is set to 5 (operation S803→operation S805).

If the increase calibration value is greater than 10% and equal to or smaller than 20%, the initial calibration coefficient Ka is set to 6 (operation S803→operation S806).

When the increase calibration value is 0, the processing of changing the initial calibration coefficient Ka in operations S803 to S806 is skipped (operation S802→operation S807), and thus, the value of the initial calibration coefficient Ka is 3 (initial value). Here, operations S801 to S809 are performed once, but in case of considering repetition processing after the processing is first performed, it is necessary to perform processing of returning the initial calibration coefficient Ka to 3 after operation S807 or S808.

After the initial calibration coefficient Ka is determined in operations S802 to S806, a thickness coefficient $K_{thickness}$ is calculated on the basis of the following equation in operation S807.

In following Equation 1, $V_{trans}$ denotes the amount of the transmitted light, $V_{ref}$ denotes the amount of the regular reflected light, $V_{diff}$ denotes the amount of the diffused reflected light, $k_m$ denotes a conveyance path width calibration coefficient, and Ka denotes an initial calibration coefficient. In the example, each amount of light is a value obtained by A/D-converting a voltage output from each light receiving part, as described above.

$$K_{thickness} = \frac{V_{trans}}{V_{diff}^{km}} + ka * \left(\frac{V_{ref}}{V_{diff}} - 1\right) \qquad \text{<Equation 1>}$$

The image forming apparatus of the example is capable of restraining the influence of detection inhibiting factors such as smoothness, glossiness, and the like, of printing paper and detecting a correct weight and has a basic concept of 'calibrating a change in the amount of the transmitted light, which is caused due to smoothness of paper, by a reflected light component'.

Detecting a weight of printing paper using the optical sensor is performed using the fact that there is a certain correlation between the amount of the transmitted light and the weight. That is, as illustrated in FIGS. 9 and 7, the weight is determined on the basis of the detected amount of transmitted light, on the basis of the correlation between the amount of the transmitted light and the weight.

However, compared with a normal smoothness sheet material, which is so-called plain paper, in high smoothness sheet material having high surface smoothness and glossiness, the amount of the regular reflected light and the amount of the diffused reflected light tend to increase and the amount of the transmitted light tends to decrease. As a result, the correlation between the amount of the transmitted light and the weight is different from that of the normal smoothness sheet material, and thus, determining the weight of the high smoothness sheet material on the basis of the correlation between the amount of the transmitted light and the weight in the normal smoothness sheet material may end up with erroneous determining. Therefore, weight detection may not be performed on the basis of the correlation between the amount of the transmitted light and the weight in the normal smoothness sheet material, that is, a single evaluation reference. As a solution, a plurality of evaluation references may be provided and a separate processing may be provided to determine smoothness or glossiness of printing paper, which, however, incurs cost.

In contrast, the image forming apparatus of the example calibrates the reduced amount of transmitted light using the amount of the reflected light and using the phenomenon that the amount of regular reflected and the amount of diffused reflected light increase while the amount of the transmitted light decreases in a high smoothness sheet material, whereby a weight of printing paper in which smoothness or glossiness of a surface thereof is different may be determined using a single evaluation reference (correlation). That is, it is possible to detect the weight of the printing paper with high robustness against detection inhibiting factors such as smoothness, glossiness, or the like, of the printing paper.

In addition, the image forming apparatus of the example has high robustness against a change (deterioration with time or temperature) in the amount of light itself from a light source (light emitting part 21).

Figure 13:
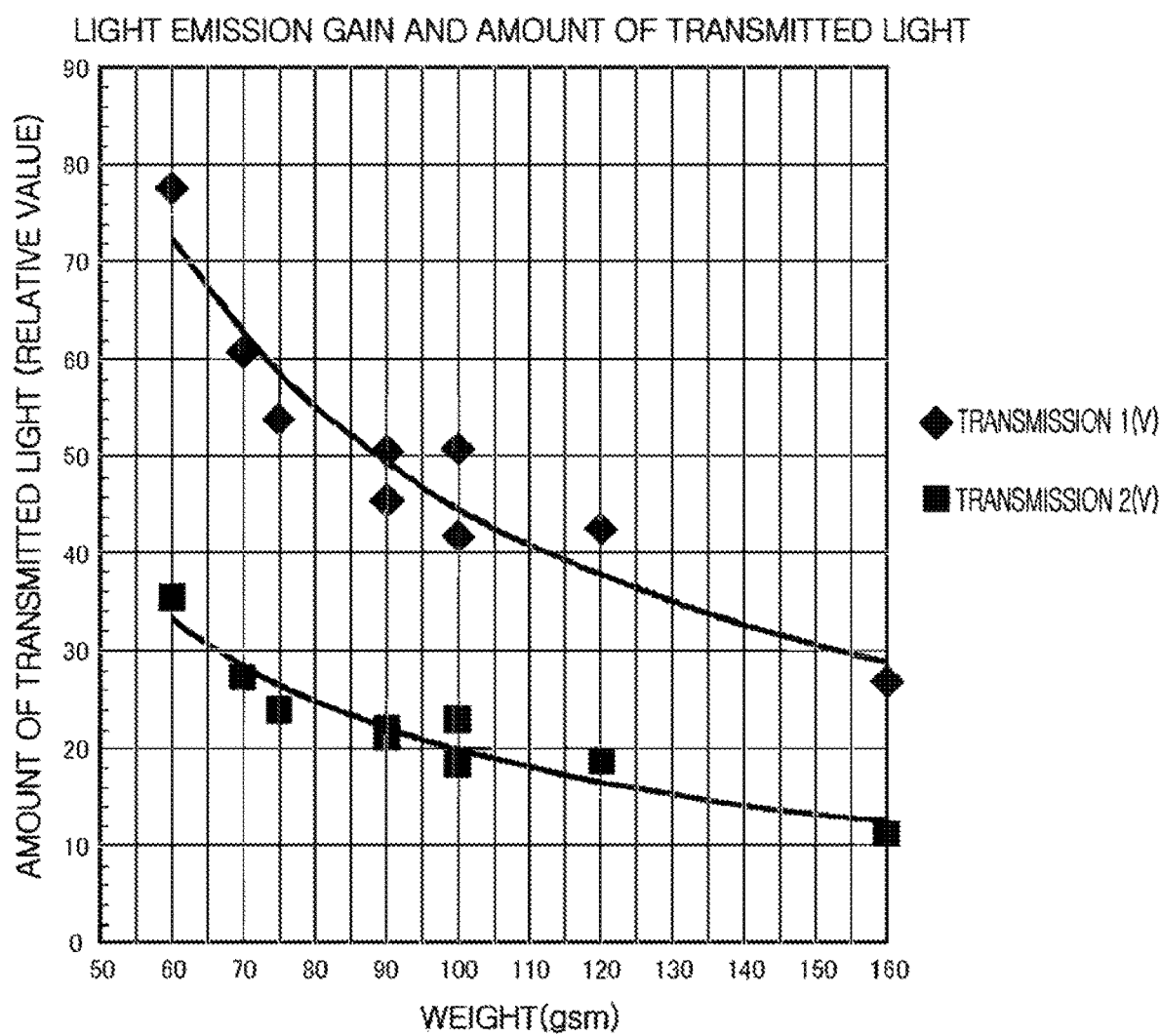
FIG. 13 is a graph comparing a correlation between a weight and the amount of transmitted light of printing paper when the amount of emitted light from a light emitting source is changed.

FIG. 13 is a graph showing comparison of correlation between a weight of printing paper and the amount of the transmitted light when the amount of emitted light from a light source itself is changed. In this graph, transmission 1 marked by the rhomboid plots represents the amount of the transmitted light when the light source is in an initial state (the amount of emitted light of 100%) and transmission 2 marked by the square plots represents the amount of the transmitted light when the amount of emitted light from the light source was reduced by 60%. The vertical axis indicates the amount of transmitted light as a relative value. Here, the "amount of transmitted light as a relatively value" comparatively indicates a relative amount of the amount of the transmitted light of the printing paper with respect to an appropriately defined reference value. As illustrated FIG. 13, if the amount of emitted light from the light source itself is reduced, the amount of the transmitted light also naturally decreases, and thus, a correlation between the amount of the transmitted light and the weight is also changed.

In contrast, when the amount of light itself from the light source (light emitting part 21) is changed, the image forming apparatus of the example calibrates (normalize) the amount of the transmitted light using the amount of the reflected light by considering the fact that the amount of the regular reflected light and the amount of the diffused reflected light, as well as the amount of the transmitted light, are also equally changed. Therefore, although the amount of emitted light itself from the light source is changed, the weight of the printing paper may be determined using the single evaluation reference.

Figure 14:
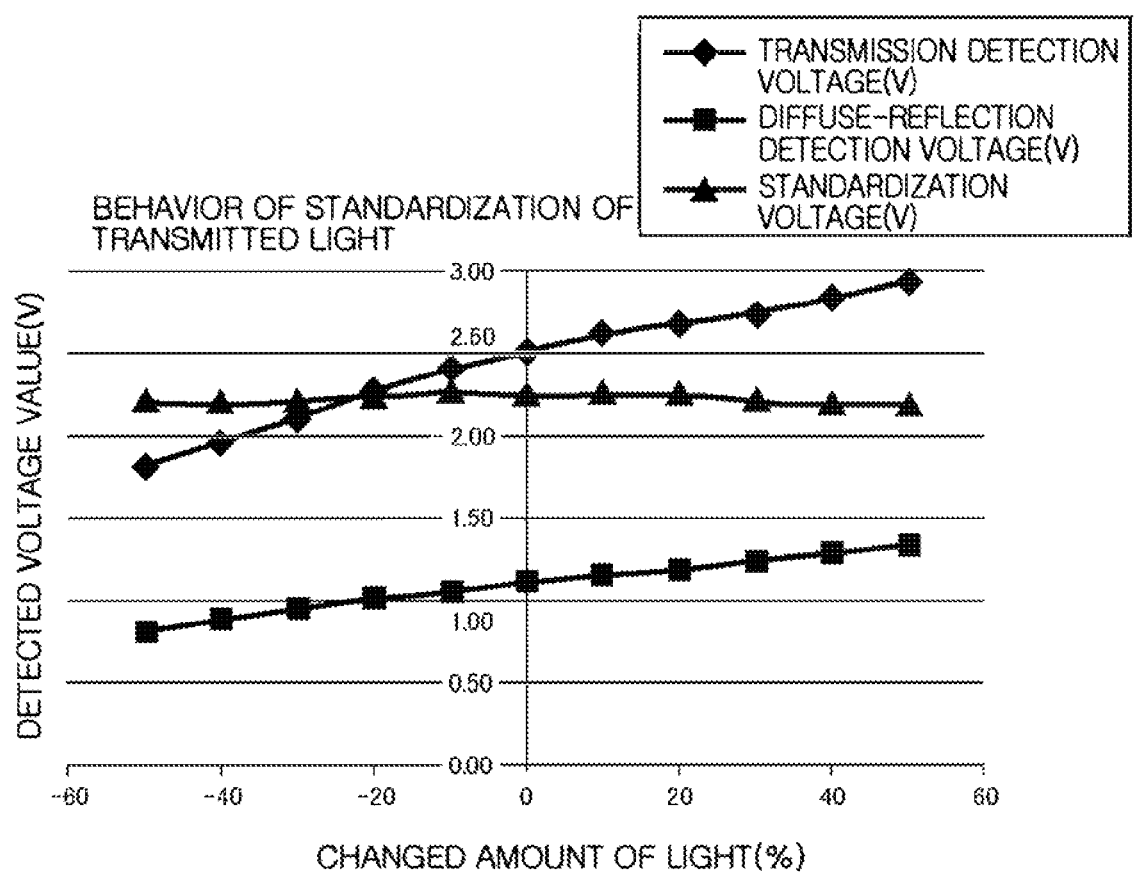
FIG. 14 is a graph illustrating a change in the amount of transmitted light when the amount of emitted light from a light emitting source is changed and stability of the amount of normalized transmitted light.

FIG. 14 is a graph illustrating a change in the amount of the transmitted light when the amount of emitted light from a light source is changed and stability of a value obtained by normalizing the amount of the transmitted light with the amount of the diffused reflected light. In this graph, the horizontal axis represents an output value (voltage value) of a light receiving sensor. As illustrated FIG. 14, if the amount of emitted light from the light source itself decreases, the amount of the transmitted light also naturally also decreases, which is, thus, not appropriate for correlation between the amount of the transmitted light and the weight described above.

In contrast, when the amount of light itself from the light source (light emitting part 21) is changed, the image forming apparatus of the example calibrates (normalize) the amount of the transmitted light using the amount of the reflected light by considering the fact that the amount of the regular reflected light and the amount of the diffused reflected light, as well as the amount of the transmitted light, are also equally changed. Therefore, although the amount of emitted light itself from the light source is changed, the weight of the printing paper may be determined using the single evaluation reference. As illustrated in FIG. 14, the amount of the transmitted light and the amount of the diffused reflected light are changed according to a change in the amount of emitted light itself from the light source, while the amount of the transmitted light (normalized voltage (V): triangular plots) normalized using the amount of the diffused reflected light is a stabilized value. That is, it is possible to detect the weight with high robustness against the detection inhibiting factor of the change in the amount of light itself from the light source (light emitting part 21).

To realize robustness against the detection inhibiting factors such as smoothness and glossiness of the printing paper, Equation 1 has a form that the value (the amount of calibrated transmitted light) equivalent to the transmitted light is calibrated (added) using the value (the amount of the calibrated reflected light) equivalent to the reflected light.

In addition, to realize robustness against the detection inhibiting factor of the change in the amount of light itself from the light source, the amount of the transmitted light is normalized on the basis of the amount of the diffused reflected light and the conveyance path width calibration coefficient Km.

That is, "$V_{trans}/(V_{diff}^{km})$" represents the pure amount of transmitted light through the printing paper and the amount of detected light diffused and reflected from the surface, respectively, and aims at being normalized to different absolute amounts. A more stable physical property value is obtained by converting the transient irregularity at the time of each detection into a normalized amount as a relative relation.

Further, $ka*(V_{ref}/V_{diff})-1$ represents surface smoothness of the printing paper, and as the relation of $V_{ref} > V_{diff}$ is stronger, the surface smoothness is higher. In terms of a configuration of the media sensor 5 of the example, it is easier to detect the amount of the regular reflected light than the amount of the diffused reflected light, and in case that the regular reflection component increases according to high smoothness, it may be sensitively reacted by the regular reflected component.

In this manner, as for the amount of the transmitted light which decreases as smoothness of the printing paper increases, the reduced amount of the transmitted light is calibrated to be preserved using the component increased as smoothness of the printing paper increases, thus realizing robustness against the detection inhibiting factors such as smoothness, glossiness, and the like, of the printing paper.

Also, because the regular reflected light receiving part 23 receives both the regular reflected light and the diffused reflected light, an output value from the regular reflected light receiving part 23 is a value representing the sum of the amount of the diffused reflected light and the amount of the regular reflected light. That is, The output value of regular reflected light receiving part 23≈the amount of the diffused reflected light+the amount of the regular reflected light, and Therefore, the amount of regular reflected light≈the output value of the regular reflection light receiving part 23−the amount of the diffused reflected light Therefore, the amount of regular reflected light/the amount of diffused reflected light≈(the output value of regular reflected light receiving part 23−the amount of diffused reflected light)/the amount of diffused reflected light, and The right side may be modified to (The output value of the regular reflected light receiving part 23 the amount of diffused reflected light)−1

That is, "(the amount of regular reflected light/the amount of diffused reflected light)−1" or "(Vref/Vdiff)−1" in k {(the amount of regular reflected light/the amount of diffuse reflected light)−1} in Equation 2 or ka {(Vref/Vdiff)−1} in Equation 1 normalizes the amount of regular reflected light on the basis of the amount of diffused reflected light.

Returning to FIG. 8, description is continued.

In operation S807, after the thickness coefficient $K_{thickness}$ is calculated on the basis of Equation 1 described above, the weight of the printing paper is determined on the basis of the thickness coefficient $K_{thickness}$ in operation S808 and the weight determination processing is terminated.

Figure 12:
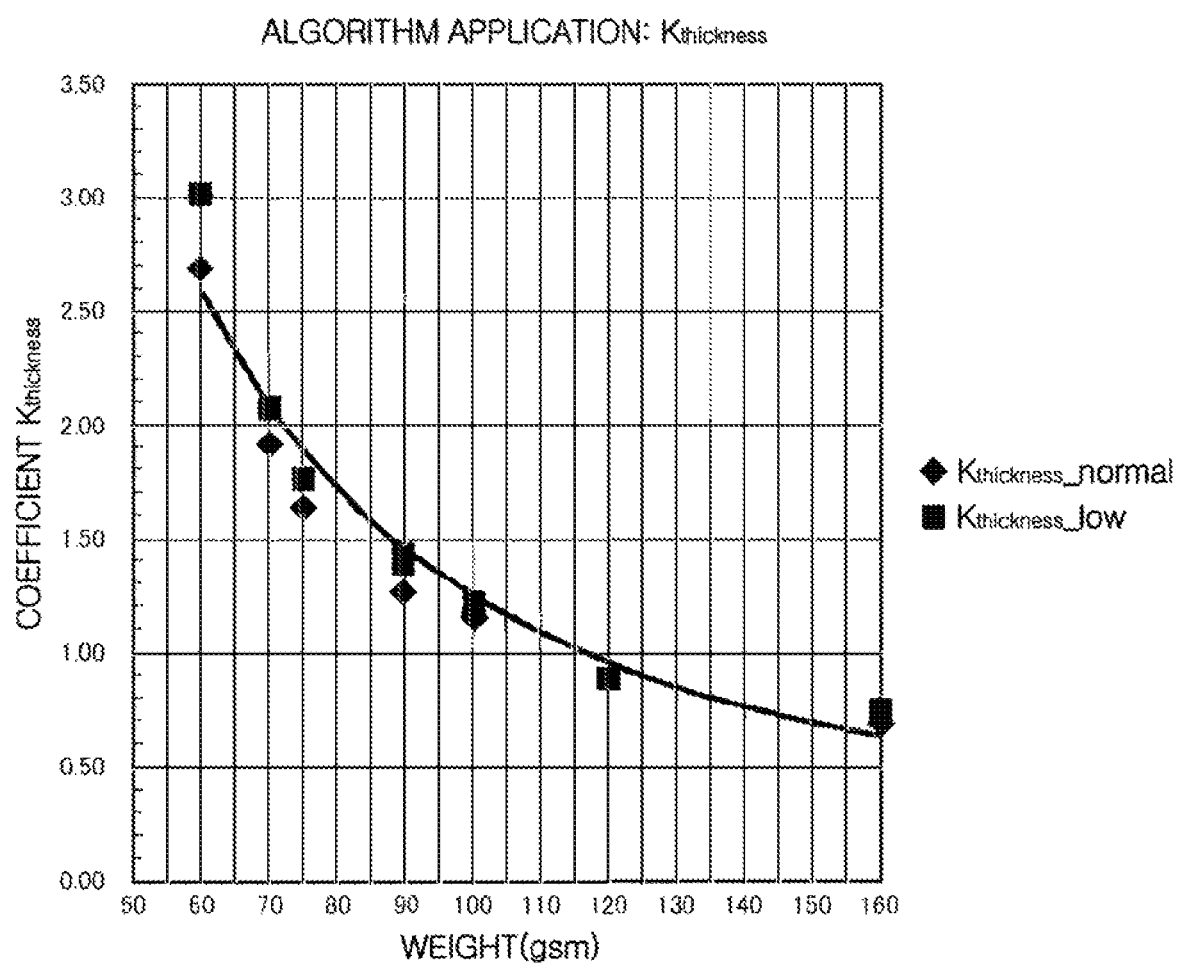
FIG. 12 is a graph illustrating a correlation between a thickness coefficient $K_{thickness}$ and a thickness of printing paper.

The "determining the weight of the printing paper on the basis of the thickness coefficient $K_{thickness}$" is determining the weight corresponding to the thickness coefficient $K_{thickness}$ calculated by performing operations S801 to S807 on the basis of the correlation between the thickness coefficient $K_{thickness}$ and the weight of the printing paper as illustrated in FIG. 12.

In the description of Equation 1 above, the thickness coefficient $K_{thickness}$ is a coefficient representing the weight of the printing paper having robustness for both the detection inhibiting factor such as smoothness, glossiness, and the like, of the printing paper and the detection inhibiting factor such as a change in the amount of light itself from the light source. Therefore, it is possible to allow the thickness coefficient $K_{thickness}$ and the weight to have a correlation of the robustness against the two inhibiting factors. That is, as illustrated in FIG. 12, the same correlation may be provided for any one of the normal smoothness sheet material ($K_{thickness}$_normal) and the high smoothness sheet material ($K_{thickness}$_low), and the weight may be determined on the basis of the single indicator (correlation).

In addition, the correlation between the thickness coefficient $K_{thickness}$ and the weight is set in advance in the apparatus, and may be set as a table or set by an equation, or the like.

Regarding the above-described weight determination, evaluations based on the results of detecting the amount of the transmitted light, the amount of the regular reflected light, and the amount of the diffused reflected light of printing paper are shown below.

Four types of printing paper A to D were prepared.
A: Normal smoothness sheet material, weight . . . 90 (gsm)
B: Normal smoothness sheet material, weight . . . 100 (gsm)
C: High smoothness sheet material, weight . . . 90 (gsm)
D: High smoothness sheet material, weight . . . 100 (gsm)

FIG. 11 is a table illustrating voltage values as detection results of the amount of the transmitted light, the amount of the regular reflected light, and the amount of the diffused reflected light for each of the normal smoothness sheet materials A and B and the high smoothness sheet materials C and D. It is also a table illustrating coefficients (thickness coefficient $K_{thickness}$, conveyance path width calibration coefficient Km, initial calibration coefficient Ka) regarding the above-described weight determination. Here, the case that the conveyance path width calibration coefficient Km defined according to models of the apparatus is 1 and the initial calibration coefficient Ka is 3 (the initial value as is) is taken as an example.

The graphs of FIGS. 9 and 10 are plotting the results of the above detection. In particular, FIG. 10 is a graph in which a portion of the plots A to D is enlarged.

Referring to FIGS. 9 and 10, the normal smoothness sheet materials A and B, which are both plain paper, are included in the correlation (normal smoothness sheet material characteristics) illustrated in the figures. In contrast, the high smoothness sheet materials C and D such as glossy paper are not included in the correlation because the amount of the transmitted light decreases. Therefore, determining a weight on the basis of the above-described correlation may end up with erroneous determination. As to the example of FIG. 10, the actual weight of the high smoothness sheet material C is 90 (gsm) but it is erroneously determined as 100 (gsm).

Meanwhile, FIG. 12 plots a relationship between the thickness coefficient $K_{thickness}$ and the weight on the basis of the thickness coefficient $K_{thickness}$ calculated by the above-described processing based on each detection value.

As illustrated in the figure, all the normal smoothness sheet materials A and B and the high smoothness sheet materials C and D have the same correlation between the thickness coefficient $K_{thickness}$ and the weight, and thus, it is possible to detect a weight with high robustness against detection inhibiting factors such as smoothness and glossiness of printing paper.

As described above, the image forming apparatus of the example is capable of detecting a weight with high robustness against the detection inhibiting factors such as smoothness and glossiness of printing paper by calibrating (preserving a reduction in the amount of the transmitted light) the amount of the transmitted light, which decreases as smoothness of the printing paper is high, using the component which increases as smoothness of the printing paper is high, on the basis of Equation 1 (or Equation 2). As a result, high robustness against the detection inhibiting factors such as smoothness and glossiness of the printing paper may be obtained by the optical sensor, without a member such as a separate image pickup device, or the like, and is very useful.

Further, because the amount of the transmitted light is normalized using the amount of the diffused reflected light, it is possible to detect the weight with high robustness against the detection inhibiting factor of a change in the amount of light itself from the light source (a light emitting part 21). Accordingly, even when the amount of light from the light source is changed (basically, the amount of light is reduced) due to a change in an environment such as aged deterioration, a high temperature and humidity, and the like, it is possible to detect the weight, in particular, without having to perform calibration, or the like. The image forming apparatus of the example may be able to detect the weight, even without calibrating the amount of emitted light, unless the amount of light from the light source is changed by 60% or greater with respect to the initial value.

In case that the amount of emitted light from the light source is changed due to aged deterioration, or the like, and an output value from any one of the light receiving parts is accordingly changed, if a proportion of the corresponding change to a predetermined reference light emission amount exceeds a predetermined change proportion (60%), processing of adjusting the amount of emitted light from the light emitting part 21 is executed and processing of changing the initial calibration coefficient Ka is performed accordingly. Thus, even after the amount of emitted light from the light emitting part 21 is adjusted, the weight determination may be correctly performed. Also, when the proportion of the corresponding change exceeds the predetermined upper limit value (80%), error processing is performed to inform a user about an error of the apparatus.

In the example, for example, the thickness coefficient $K_{thickness}$ is calculated based on Equation 1 using the voltage values which are output values from the light receiving parts as values indicating the amount of the transmitted light, the amount of the diffused reflected light, and the amount of the regular reflected light, respectively.

That is, the case of using the output values (voltage values) from the respective light receiving parts as the values of the amount of the transmitted light, the amount of the diffused reflected light, and the amount of the regular reflected light in Equation 2 is used as an example, but the disclosure is not limited thereto. For example, values obtained by normalizing the output values from the respective light receiving parts may be used as values representing the respective amounts of light in Equation 2 below, or the amount of the transmitted light as a relative value may also be used.

$$K_{thickness} = \frac{\text{amount of transmitted light}}{\text{amount of diffuse}-\text{reflected } light^{km}} + Ka^* \left( \frac{\text{amount of regular}-\text{reflected light}}{\text{amount of diffuse}-\text{reflected light}} - 1 \right) \qquad \text{<Equation 2>}$$

Here, the coefficient $K_{thickness}$ denotes the thickness coefficient, km denotes a conveyance path width calibration coefficient determined according to a distance between any one of light receiving sensors detecting the amount of the regular reflected light, the amount of the diffused reflected light, and the amount of the transmitted light and the light emitting element, and ka denotes the initial calibration coefficient determined according to emission characteristics of the light emitting element.

The "values obtained by normalizing the output values from the respective light receiving part" are the ratio of output values of the light receiving part when printing paper as a measurement target is interposed to an output value of the light receiving part when light is received without interposing the paper or an output value of the light receiving part when a reference sheet is interposed. Also, the "amount of transmitted light as a relative value" comparatively indicates a relative amount of the amount of the transmitted light (output value of the light receiving part) of the printing paper with respect to an appropriately defined reference value.

The concept of the disclosure is to calibrate a change in the amount of the transmitted light by the reflective light component using a value which may represent each of the amount of the transmitted light, the amount of the diffused reflected light, and the amount of the regular reflected light. Therefore, for example, the amount of the transmitted light, the amount of the diffused reflected light, and the amount of the regular reflected light in Equation 2 are not limited to the values that directly represent the amount of light itself (e.g., lumen, etc.) and may be values which may correspond to the respective amounts of light such as the voltage values as output values from the respective light receiving parts described in the example or the normalized values described above.

In this example, the case that the conveyance path width calibration coefficient Km is set in advance in the apparatus by calibration, or the like, in the manufacturing process is taken as an example but the disclosure is not limited thereto. For example, a sensor for measuring a distance between the light emitting element and any one of the light receiving sensors or an input part for receiving an input of information corresponding to the distance between the light emitting element and any one of the light receiving sensors may be provided and the conveyance path width calibration coefficient Km may be set with reference to a calibration table A (FIG. 6) on the basis of an obtained distance between the sensors. Here, as for the input "information corresponding to the distance between the light emitting element and any one of the light receiving sensors", for example, a table in which product names or model names are matched to the distances between sensors is provided and a distance between the sensors may be determined on the basis of an input of a product name or a model name. In this case, the product name, the model name, and the like, is "information corresponding to the distance between the light emitting element and any one of the light receiving sensors". Also, the input part may be a user interface receiving an input from a person (service man, user, etc.) or may be an interface (regardless of whether it is wired or wireless interface) receiving an input from an external device.

The conveyance path width calibration coefficient Km and the initial calibration coefficient Ka may be appropriately determined in consideration of the characteristics of each apparatus. A calculation method in Equation 2 may be changed according to determination of a numerical value thereof. That is, in the disclosure, the amount of the diffused reflected light is exponentiated from the conveyance path width calibration coefficient Km, for example, but the calculation method may be changed according to methods for defining the conveyance path width calibration coefficient Km or characteristics of the apparatus. For example, the conveyance path width calibration coefficient Km may be multiplied to the amount of diffuse reflected amount so as to be calibrated. This is the same with the initial calibration coefficient Ka. Calibration using the conveyance path width calibration coefficient Km or the initial calibration coefficient Ka is calibration for precisely or efficiently executing the processing of determining a weight based on the concept described above in an apparatus and may be appropriately optimized for an individual apparatus.

In the example, determining a weight is described but a thickness may also be determined. The correlation between the thickness coefficient $K_{thickness}$ and a thickness of printing paper may be provided, instead of the correlation between the thickness coefficient $K_{thickness}$ and the weight of printing paper illustrated in FIG. 12.

In this example, the case that the media sensor (optical sensor) includes the transmitted light receiving part (transmitted light receiving sensor), the regular reflected light receiving part (regular reflected light receiving sensor), and the diffused reflected light receiving part (diffused reflected light receiving sensor) and each sensor detects the amount of the transmitted light, the amount of the regular reflected light, and the amount of the diffused reflected light is taken as an example, but one or two sensors may be used for detecting the amount of the transmitted light, the amount of regular reflected light, and the amount of the diffused reflected light.

Figure 15:
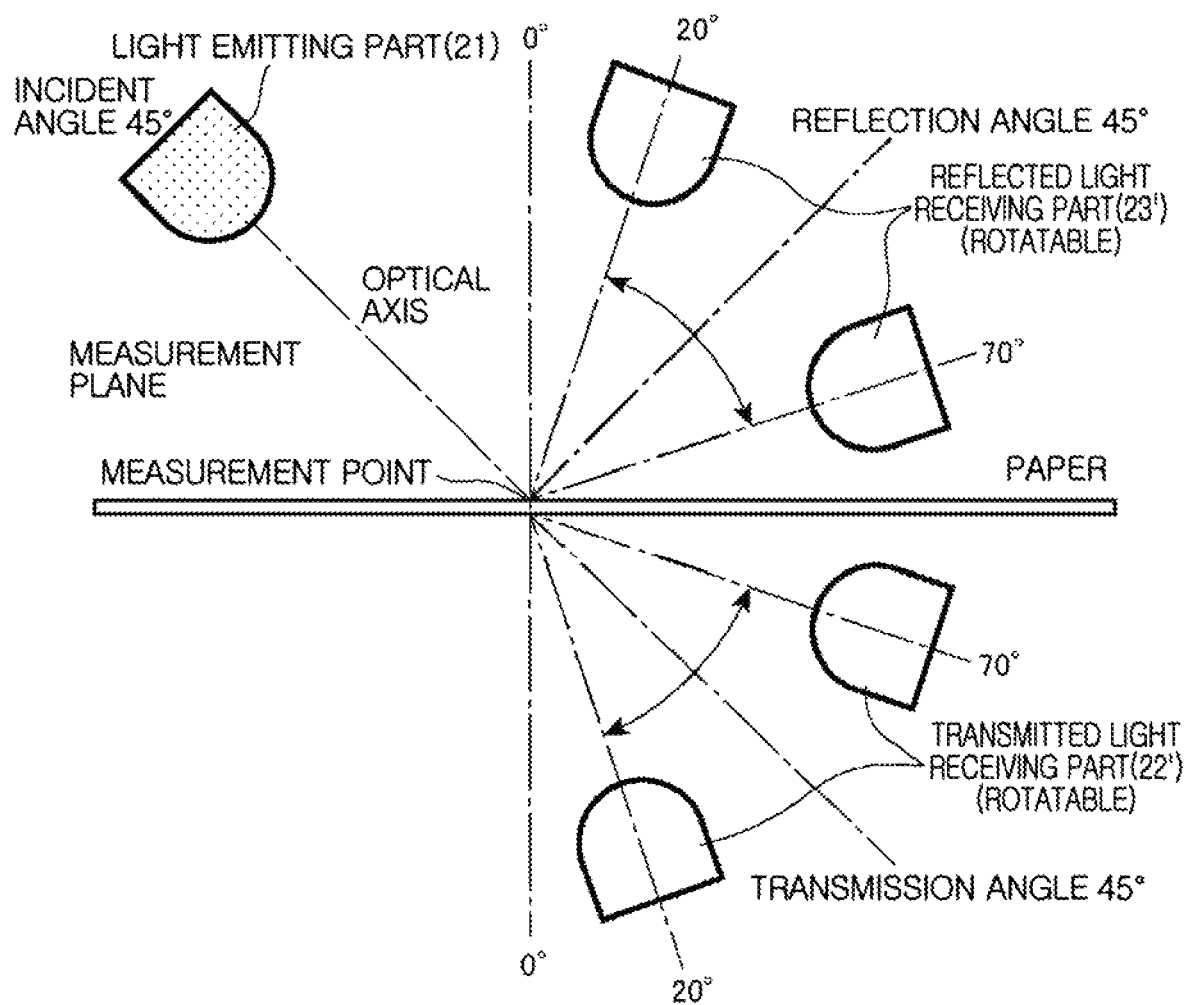
FIG. 15 is a conceptual view illustrating another example of a paper sensor according to the disclosure.

FIG. 15 is a view illustrating a media sensor (optical sensor) including two light receiving sensors. In this example, a transmitted light receiving part 22' (first light receiving sensor) and a reflected light receiving part 23' (second light receiving sensor) are provided.

The transmitted light receiving part 22' and the reflected light receiving part 23' are configured to rotate in a measurement plane which is a plane including an optical axis perpendicular to printing paper based on a measurement point as an intersection point of an optical axis of the light emitting part 21 and the printing paper. As illustrated in FIG. 15, the transmitted light receiving part 22' is configured to rotate in a range opposite to the light emitting part 21 with respect to the printing paper, and the reflected light receiving part 23' may be configured to rotate in a range which is the side where the light emitting part 21 is present with respect to the printing paper.

In the media sensor having such a configuration, the amount of received light is measured by rotating the transmitted light receiving part 22' in a predetermined range (e.g., in the range of 20 to 70° as illustrated in FIG. 15) and a peak value thereof is obtained as the amount of the transmitted light. Similarly, the amount of received light is measured by rotating the reflected light receiving part 23' in a predetermined range (e.g., in the range of 20 to 70° as illustrated in FIG. 15), a peak value thereof is obtained as the amount of the regular reflected light, and an appropriately selected value is used as the amount of the diffused reflected light (e.g., a measurement value at a predetermined angle is used, etc.).

In the processing of measuring the amount of received light, while rotating the transmitted light receiving part 22' or the reflected light receiving part 23', the amount of received light may be measured, while conveying the printing paper, and if this is difficult due to a relationship of a conveyance speed of the printing paper with respect to a rotation speed of the light receiving part, the measurement may be performed by stopping conveying (or by lowering the speed).

The processing after obtaining the respective amounts of received light is the same as that of the above example.

As illustrated in FIG. 15, by using the single sensor to detect the amount of the regular reflected light and the amount of the diffused reflected light, the number of the light receiving sensors may be reduced and a proportion of the amount of the regular reflected light and the amount of the diffused reflected light may not need to be calibrated. Also, by detecting the amount of received light in a predetermined range (e.g., the range of 20 to 70° as illustrated in FIG. 15), a peak value thereof may be accurately obtained, and because a profile of the amount of light is obtained in the predetermined range, it is possible to use the corresponding information to determine a type of paper.

Also, in FIG. 15, the case that two light receiving sensors including the transmitted light receiving part 22' (first light receiving sensor) and the reflected light receiving part 23' (second light receiving sensor) are provided is described as an example, but a single light receiving sensor configured to rotate from one side of the light emitting part 21 to the opposite side thereof with respect to the printing paper may also be provided. In this case, if it is difficult to rotate with the printing paper, the corresponding printing paper may be conveyed, and thereafter, the amount of received light on the opposite side in next printing paper may be detected. In this case, however, the corresponding subsequent printing paper is to be the same type of paper.

Figure 16:
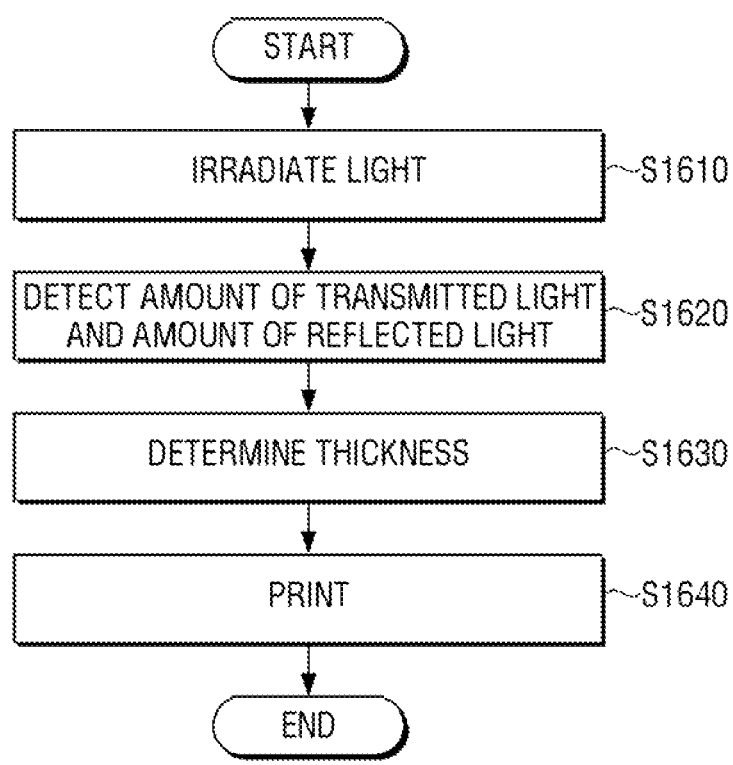
FIG. 16 is a flowchart illustrating an image forming method according to an example of the disclosure.

FIG. 16 is a flowchart illustrating a thickness determining method according to an example of the disclosure.

Referring to FIG. 16, light is irradiated to printing paper in operation S1610. As an example, light may be irradiated to the printing paper using a light emitting element that emits light.

The amount of the transmitted light transmitted through the printing paper and the amount of the reflected light reflected from the printing paper are detected from each of a plurality of positions in operation S1620. As an example, the amount of the transmitted light and the amounts of a plurality of reflected lights may be detected using a plurality of light receiving elements. Meanwhile, when realized, a light receiving sensor may be configured to be rotatable and the single light receiving sensor may be used as illustrated in FIG. 15.

Thereafter, a thickness of the printing paper is determined on the basis of the amount of the transmitted light and the amounts of the plurality of reflected lights in operation S1620. As an example, the amount of the calibrated transmitted light may be calculated by normalizing the amount of the transmitted light on the basis of the amount of first reflected light among the amounts of the plurality of reflected lights, the amount of the calibrated reflected light may be calculated by normalizing the amount of second reflected light different from the amount of the first reflected light on the basis of the amount of the first reflected light, a thickness coefficient may be calculated by adding the amount of the calibrated transmitted light and the amount of the calibrated reflected light, and a thickness of the printing paper may be determined on the basis of the calculated thickness coefficient.

Thereafter, an image is formed on the printing paper on the basis of the determined thickness in operation S1640. As an example, a printing operation may be performed by adjusting a printing speed, a fixing state, and a developing state on the basis of the determined thickness of the printing paper.

Therefore, in the image forming method according to the example, the thickness of the printing paper is determined in consideration of the amount of the calibrated reflected light, as well as the amount of the transmitted light, an influence of the detection inhibiting factors such as smoothness and glossiness of the printing paper may be suppressed and the correct thickness may be detected. The image forming method as illustrated in FIG. 16 may be executed on an image forming apparatus having the configuration of FIG. 1 or FIG. 2 and may also be executed on an image forming apparatus having other configurations.

In addition, the image forming method as described above may be implemented as at least one executable program for executing the image forming method as described above, and the executable program may be stored in a computer-readable recording medium.

While the disclosure has been described with reference to the accompanying drawings, it is to be understood that the scope of the disclosure is defined by the claims described hereinafter and should not be construed as being limited to the above-described examples and/or drawings. It is to be clearly understood that improvements, changes, and modifications that are obvious to those skilled in the art are also within the scope of the disclosure as defined in the claims.

What is claimed is:

1. An image forming apparatus comprising:
    an image forming device to form an image on a printing medium; and
    a sensor to,
        irradiate light to the printing medium,
        detect an amount of light transmitted through the printing medium, and
        detect an amount of light reflected from the printing medium, resulting in a control of a printing operation of the image forming device based the amount of light transmitted through the printing medium, the amount of light reflected from the printing medium, and a distance between a light emitting device and a light receiving sensor.

2. The image forming apparatus as claimed in claim 1, wherein the sensor further includes the light emitting device including at least one light emitting element, and the resulting control of the printing operation of the image forming device is based on a thickness of the printing medium that is indicated by the amount of light transmitted through the printing medium, the amount of light reflected from the printing medium, and the distance.

3. The image forming apparatus as claimed in claim 2, wherein the sensor further includes a first light receiving sensor to sense the amount of light transmitted through the printing medium among light irradiated from the at least one light emitting element.

4. The image forming apparatus as claimed in claim 3, wherein the sensor further includes a second light receiving sensor to detect an amount of light regular reflected from the printing medium among light irradiated from the at least one light emitting element.

5. The image forming apparatus as claimed in claim 4, wherein the sensor further includes a third light receiving sensor to detect an amount of the reflected light diffuse reflected from the printing medium among light irradiated from the at least one light emitting element.

6. An image forming apparatus comprising:
    an image forming device to form an image on a printing medium; and
    a sensor to,
        irradiate light to the printing medium,
        detect an amount of light transmitted through the printing medium, and
        detect an amount of light reflected from the printing medium, resulting in a control of a printing operation of the image forming device based the amount of light transmitted through the printing medium and the amount of light reflected from the printing medium,
    wherein the sensor includes a light receiving sensor to rotate in a measurement plane, the measurement plane including an optical axis of a light emitting element perpendicular to the printing medium based on a measurement point which is an intersection point of the optical axis and the printing medium.

7. The image forming apparatus as claimed in claim 1, wherein
    the sensor includes a first light receiving sensor to measure the amount of the transmitted light at a regular transmission angle.

8. The image forming apparatus as claimed in claim 1, wherein the sensor includes a light receiving sensor to measure an amount of the regular reflected light at a regular reflection angle.

9. The image forming apparatus as claimed in claim 1, wherein the sensor includes a light receiving sensor to measure an amount of the diffused reflected light at a diffuse reflection angle.

10. The image forming apparatus as claimed in claim 7, wherein the sensor includes a second light receiving sensor to measure an amount of the regular reflected light at a regular reflection angle.

11. The image forming apparatus as claimed in claim 7, wherein the sensor includes a second light receiving sensor to measure an amount of the diffused reflected light at a diffuse reflection angle.

12. The image forming apparatus as claimed in claim 10, wherein the sensor includes a third light receiving sensor to measure an amount of the diffused reflected light at a diffuse reflection angle.

13. The image forming apparatus as claimed in claim 2, further including a distance sensor to measure the distance between the light emitting element and the light receiving sensor.

* * * * *